United States Patent
Kwon et al.

(10) Patent No.: US 8,044,290 B2
(45) Date of Patent: Oct. 25, 2011

(54) METHOD AND APPARATUS FOR REPRODUCING FIRST PART OF MUSIC DATA HAVING PLURALITY OF REPEATED PARTS

(75) Inventors: O-kyun Kwon, Seoul (KR); Young-Il Park, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 173 days.

(21) Appl. No.: 12/250,649

(22) Filed: Oct. 14, 2008

(65) Prior Publication Data
US 2009/0229447 A1    Sep. 17, 2009

(30) Foreign Application Priority Data
Mar. 17, 2008   (KR) .................. 10-2008-0024366

(51) Int. Cl.
*G10H 1/00*   (2006.01)
(52) U.S. Cl. ................... 84/609; 84/649; 700/94
(58) Field of Classification Search ........... 84/600–602, 84/609, 649; 700/94
See application file for complete search history.

(56) References Cited

U.S. PATENT DOCUMENTS

| | | | |
|---|---|---|---|
| 7,179,982 B2 * | 2/2007 | Goto .............................. | 84/616 |
| 7,304,231 B2 * | 12/2007 | van Pinxteren et al. ........ | 84/615 |
| 7,345,233 B2 * | 3/2008 | van Pinxteren et al. ........ | 84/615 |
| 7,551,834 B2 * | 6/2009 | Kashino et al. ................. | 386/46 |
| 7,577,334 B2 * | 8/2009 | Kashino et al. ................. | 386/68 |
| 7,668,610 B1 * | 2/2010 | Bennett .......................... | 700/94 |
| 2003/0089216 A1 * | 5/2003 | Birmingham et al. ......... | 84/609 |
| 2003/0205124 A1 * | 11/2003 | Foote et al. .................... | 84/608 |
| 2005/0053355 A1 * | 3/2005 | Kashino et al. ................. | 386/46 |
| 2005/0084238 A1 * | 4/2005 | Kashino et al. ................. | 386/69 |
| 2005/0241465 A1 * | 11/2005 | Goto .............................. | 84/616 |
| 2007/0180979 A1 * | 8/2007 | Rosenberg ..................... | 84/611 |
| 2008/0209484 A1 * | 8/2008 | Xu ................................ | 725/105 |
| 2009/0005890 A1 * | 1/2009 | Zhang ............................ | 700/94 |
| 2009/0287323 A1 * | 11/2009 | Kobayashi ..................... | 700/94 |

* cited by examiner

*Primary Examiner* — David S. Warren
(74) *Attorney, Agent, or Firm* — Staas & Halsey LLP (57) ABSTRACT

A method and apparatus for reproducing a first part of music data having a plurality of repeated parts includes a method and an apparatus allowing a user to listen to more songs including the repeated parts by searching for a boundary between the first and second parts of the music data having the repeated parts via simple frequency analysis, marking information indicating the found boundary, and reproducing the music data until a part indicated by the marked information is reached. Accordingly, music reproduction satisfaction increases since an inconvenience of manipulating the apparatus for each song is lessened and more songs having different patterns are played.

24 Claims, 7 Drawing Sheets

METHOD AND APPARATUS FOR REPRODUCING FIRST PART OF MUSIC DATA HAVING PLURALITY OF REPEATED PARTS

CROSS-REFERENCE TO RELATED APPLICATION

This application claims all benefits accruing under 35 U.S.C. §119 from Korean Patent Application No. 2008-24366, filed on Mar. 17, 2008, in the Korean Intellectual Property Office, the disclosure of which is incorporated herein by reference.

BACKGROUND OF THE INVENTION

1. Field of the Invention

The present invention relates to reproducing music data having a plurality of repeated parts, and more particularly, to a method and apparatus for reproducing only a portion of music data, such as, a first part of the music data having a plurality of repeated parts.

2. Description of the Related Art

Almost all music or song has similar repeated parts or patterns. For example, music or song with lyrics includes a plurality of verses, but in most cases, only the lyrics are different while notes are the same. Many people listen to a plurality of such songs by using an MP3 player or a CD player in their free time. Of such people, some tend not to listen to a song until it ends, but only listen to a portion of the song, such as, a first part of repeated parts, and then proceed to listen to a next song. Specifically, when a song has the same repeated patterns, they often wish to listen to the pattern only once and then listen to a song with a different pattern. In this manner, more songs can be played in a given period since each song is played within a short time period when compared to a case when each song is played until the end. Accordingly, listener satisfaction increases.

However in a typical apparatus for reproducing music, a technology for automatically skipping a song that includes the repeated parts once the first part of the repeated parts is reproduced does not exist. Accordingly, a user has to manipulate the apparatus in order to skip to a next song, which is inconvenient.

SUMMARY OF THE INVENTION

The present invention provides a technology allowing an apparatus for reproducing music to automatically skip a song that includes repeated parts after reproducing a portion thereof, such as, a first part of the repeated parts. The present invention also provides a method and apparatus for reproducing a portion, such as, a first part, of music data that includes a plurality of repeated parts, and a computer readable recording medium having recorded thereon a program for executing the above method.

Additional example embodiments and/or advantages of the invention will be set forth in part in the description which follows and, in part, will be obvious from the description, or may be learned by practice of the invention.

According to an example embodiment of the present invention, a method of reproducing music data having a plurality of repeated parts, comprises: searching for a boundary between a first part and a second part from among a plurality of repeated parts by analyzing music data including the repeated parts in a frequency domain; marking information indicating that the boundary between the first and second parts is a point where the first part ends; and reproducing the music data from a beginning of the music data to a part indicated by the marked information.

According to an example embodiment of the present invention, the searching for the boundary may include: dividing the music data into two parts, each part being ½ of the whole reproducing time, and establishing the first half as a first window; searching for a first identical part that is identical to the first window by scanning a part excluding a starting point of the music data from the beginning; and determining a starting point of the first identical part as the boundary between the first and second parts.

According to an example embodiment of the present invention, the searching for the first identical part may include determining a part that is identical to the first window at a predetermined rate or more from the part excluding the starting point of the music data as the first identical part.

According to an example embodiment of the present invention, the searching for the boundary may further include, if the first identical part is not found, searching for the boundary by dividing the music data into at least three parts over the whole reproducing time.

According to an example embodiment of the present invention, the searching for the boundary by dividing the music data into at least three parts may include: dividing the music data into n parts, each part being 1/n of the whole reproducing time, and establishing a first part of the n parts as a second window, where n is an integer equal to or greater than 3; searching for a second identical part that is identical to the second window by scanning the part excluding the starting point of the music data from the beginning of the music data; and determining a starting point of the second identical part as the boundary.

According to an example embodiment of the present invention, the searching for the second identical part may include determining a part that is identical to the second window at a predetermined rate or more from the part excluding the starting point of the music data as the second identical part.

According to an example embodiment of the present invention, the searching for the boundary may further include, if the boundary is not found while searching for the second identical part: increasing the value of n by 1; and repeating the dividing of the music data into n parts and establishing the first part of the n parts as the second window, the searching for the second identical part that is identical to the second window, and the determining of the starting point of the second identical part as the boundary.

According to an example embodiment of the present invention, the plurality of repeated parts included in the music data may be a plurality of verses, and the first part and the second part in the repeated parts may be respectively a first verse and a second verse of the music data.

According to an example embodiment of the present invention, the searching for the boundary between the first part and the second part and the marking of the information may be performed while the music data is being reproduced.

According to an example embodiment of the present invention, the method may further include, while the current music data is being reproduced, searching for a boundary between the first part and the second part from among a plurality of repeated parts for the next music data and marking information indicating that the boundary between the first and second parts is a point where the first part ends on the next music data.

According to another example embodiment of the present invention, there is provided an apparatus for reproducing music data, the apparatus including: a boundary searcher, which searches for a boundary between a first part and a second part from among a plurality of repeated parts by analyzing music data having the plurality of repeated parts in a frequency domain; an information marker, which marks information indicating that the boundary is a point where the first part ends; and a music reproducer, which reproduces the music data from a beginning of the music data to a part indicated by the marked information.

According to an example embodiment of the present invention, the boundary searcher may include a first identical part searcher, which divides the music data into two parts, each part being ½ of the whole reproducing time, establishes the first half as a first window, searches for a first identical part that is identical to the first window by scanning a part excluding a starting point of the music data from the beginning of the music data, and determines a starting point of the first identical part as the boundary between the first and second parts.

According to an example embodiment of the present invention, the first identical part searcher may determine a part that is identical to the first window at a predetermined rate or more from the part excluding the starting point of the music data as the first identical part.

According to an example embodiment of the present invention, the boundary searcher may further include a second identical part searcher, which, if the first identical part searcher did not find the first identical part, searches for the boundary by dividing the music data into at least three parts of the whole reproducing time.

According to an example embodiment of the present invention, the second identical part searcher may divide the music data into n parts, each part being 1/n of the whole reproducing time, and establish a first part of the n parts as a second window, where n is an integer equal to or greater than 3, search for a second identical part that is identical to the second window by scanning the part excluding the starting point of the music data from the beginning, and determine a starting point of the second identical part as the boundary.

According to an example embodiment of the present invention, the second identical part searcher may determine a part that is identical to the second window at a predetermined rate or more from the part excluding the starting point of the music data as the second identical part.

According to an example embodiment of the present invention, the boundary searcher, if the second identical part searcher did not find the boundary, may increase the value of n by 1 so that the second identical part searcher repeats the dividing of the music data into n parts and establishing the first part of the n parts as the second window, the searching for the second identical part that is identical to the second window, and the determining of the starting point of the second identical part as the boundary.

According to an example embodiment of the present invention, the plurality of repeated parts included in the music data are a plurality of verses, and the first part and the second part in the repeated parts may be respectively a first verse and a second verse of the music data.

According to an example embodiment of the present invention, the boundary searcher and the information marker may respectively search for the boundary between the first part and the second part and marks of the information while the music reproducer reproduces the music data.

According to an example embodiment of the present invention, a method of reproducing a portion of audio data having a repeating pattern comprises: dividing the audio data into at least two portions; selecting a first portion of the at least two portions as a first window, the first portion being the closest of the at least two portions to a beginning of the audio data; using the first window to scan the audio data starting from a point that is not the beginning of the audio data, and finding a portion of the audio data that matches the first window; marking a start point of the matching portion of the audio data as a start point of a first repeating portion of the audio data; and reproducing the audio data from the beginning of the audio data to the start point of the first repeating portion to reproduce the portion of audio data having the repeating pattern.

According to an example embodiment of the present invention, an apparatus for reproducing a portion of audio data having a repeating pattern comprises: a searcher to divide the audio data into at least two portions, to select a first portion of the at least two portions as a first window, the first portion being the closest of the at least two portions to a beginning of the audio data, and to use the first window to scan the audio data starting from a point that is not the beginning of the audio data and to find a portion of the audio data that matches the first window; a marker to mark a start point of the matching portion of the audio data as a start point of a first repeating portion of the audio data; and a reproducer to reproduce the audio data from the beginning of the audio data to the start point of the first repeating portion to reproduce the portion of audio data having the repeating pattern.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Reference will now be made in detail to example embodiments of the present invention, examples of which are illustrated in the accompanying drawings, wherein like reference numerals refer to the like elements throughout. The example embodiments are described below in order to explain the present invention by referring to the figures.

Figure 1:
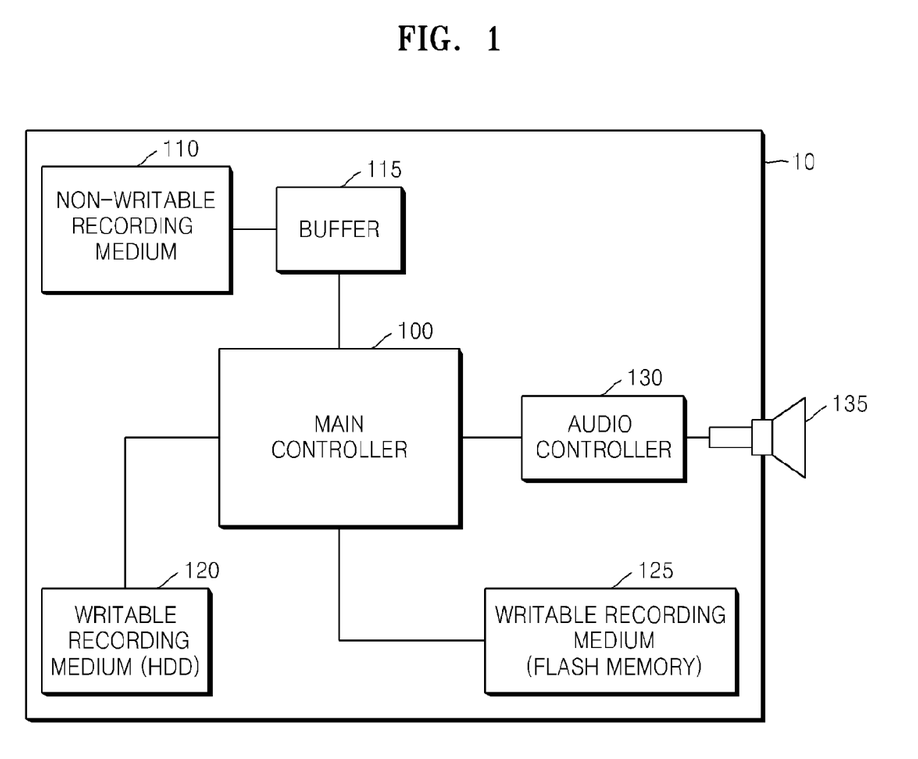
FIG. 1 is a block diagram illustrating an apparatus for reproducing music according to an example embodiment of the present invention.

FIG. 1 is a block diagram illustrating an apparatus 10 for reproducing music according to an example embodiment of the present invention. Referring to FIG. 1, the apparatus 10 includes a main controller 100, a non-writable recording medium 110, a buffer 115, rewritable recording media 120 and 125, an audio controller 130, and a speaker 135.

The main controller 100 is a core element of various example embodiments of the present invention, and performs a method of reproducing music data that will be described later. The main controller 100 may be realized as a system on chip (SOC), or as a central processing unit (CPU). Various components of the main controller 100 as shown in FIG. 1, such as the system on chip (SOC), or the central processing unit (CPU) can be integrated into a single control unit, or alternatively, can be implemented in software or hardware, such as, for example, a field programmable gate array (FPGA) or an application specific integrated circuit (ASIC). As such, it is intended that the processes described herein be broadly interpreted as being equivalently performed by software, hardware, or a combination thereof. Further, software modules can be written, via a variety of software languages, including C, C++, Java, Visual Basic, and many others. These software modules may include data and instructions which can also be stored on one or more machine-readable storage media, such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs). Instructions of the software routines or modules may also be loaded or transported into the wireless cards or any computing devices on the wireless network in one of many different ways. For example, code segments including instructions stored on floppy discs, CD or DVD media, a hard disk, or transported through a network interface card, modem, or other interface device may be loaded into the system and executed as corresponding software routines or modules.

Music data to be reproduced may be recorded on the non-writable recording medium 110 like an optical disk drive (ODD), but it is impossible for the main controller 100 to perform an additional recording of music data, or other information (such as marking information) on the non-writable recording medium 110. Accordingly, in order to perform a method according to example embodiments of the present invention, such as, to mark information, the music data recorded on the non-writable recording medium 100 is to be copied on the buffer 115.

The rewritable recording media 120 and 125 are recording media where the main controller 100 can mark information, like a hard disk drive (HDD) or a flash memory. Accordingly, direct boundary search and information marking are possible with regard to music data stored in the rewritable recording media 120 and 125, and use of a buffer is unnecessary. However, a separate buffer may be further included if it is efficient to process the music data, recorded on the rewritable recording media 120 and 125, after copying the music data to the separate buffer.

The audio controller 130 outputs the music data to the speaker 135 after decoding the music data. The speaker 135 is illustrated in FIG. 1 as an example, but other types of sound generating apparatus may be used instead of the speaker 135, such as, earphones.

Also, the system may not include the non-writable recording medium 110 and the rewritable recording media 120 and 125 all together. For example, if the system is an MP3 player, only the rewritable recording medium 125, such as a memory device (e.g., flash memory) may be included instead of the non-writable recording medium 110 and the rewritable recording medium 120, such as, the HDD. Alternatively, if the system is a CD player, only the non-writable recording medium 110, such as, a CD, may be included. Alternatively, if the system is a portable media player (PMP), the rewritable recording media 120 and 125, such as, an HDD and a flash memory, respectively, may be included instead of the non-writable recording medium 110.

Figure 2A:
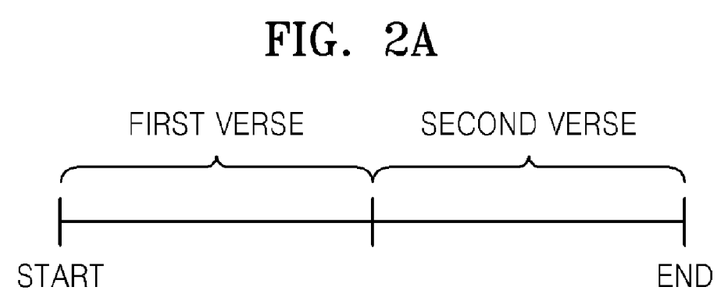
FIGS. 2A-2C are diagrams illustrating examples of music data that include a plurality of repeated parts.
Figure 2B:
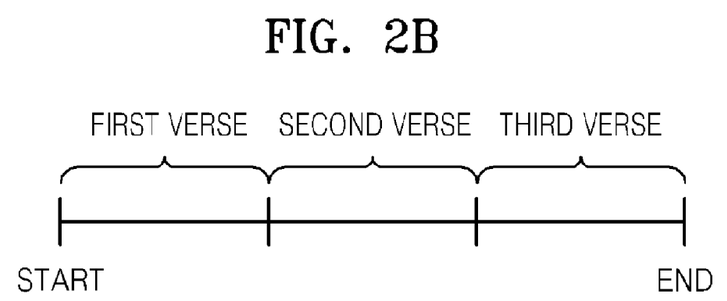
Figure 2C:
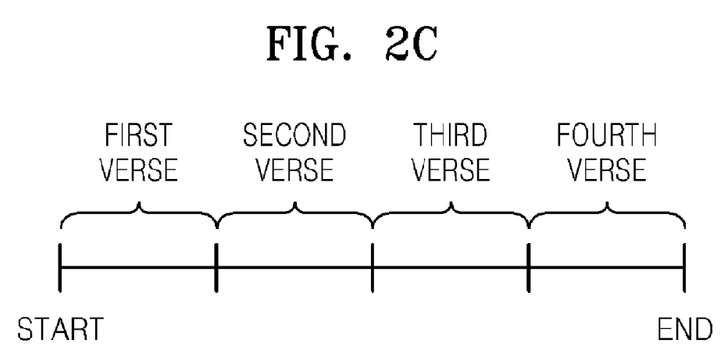

FIGS. 2A-2C are diagrams illustrating examples of music data that include a plurality of repeated parts, such as verses. FIG. 2A illustrates music data including two verses, i.e., the first verse and the second verse. FIG. 2B illustrates music data including three verses, i.e., the first, second, and third verses. FIG. 3C illustrates music data including four verses, i.e., the first through fourth verses. It is understood that the number of repeated parts or verses is not limited to one through four.

In almost all music or song, the same or similar patterns of lyrics and/or notes, for example, are repeated. In the case of music data including the first and second verses (i.e., FIG. 2A), the notes of the first and second verses may be the same, but the lyrics may be different. Accordingly, a boundary between the first and second verses can be identified and/or classified via simple frequency analysis, for example. In other example embodiments, lyrics and/or notes analysis may be performed, whereby degree of similarity or matching of the lyrics and/or notes is performed, for example, for identification and/or marking of the boundary. In example embodiments, the boundary also refers to a point where the first verse ends and the second verse begins, or is simply a point where a part that is identical to the first verse begins.

After finding a boundary between the first and second verses, information indicating the boundary may be marked. In the case of an MP3 file, a music data thereof includes a header, side information, main data, and ancillary data. The MP3 file further includes a tag for storing music information called ID3. Accordingly, information indicating an ending part of the first part can be easily marked by marking the information indicating the boundary between the first and second verses on the ancillary data or the ID3 tag, for example.

Figure 3:
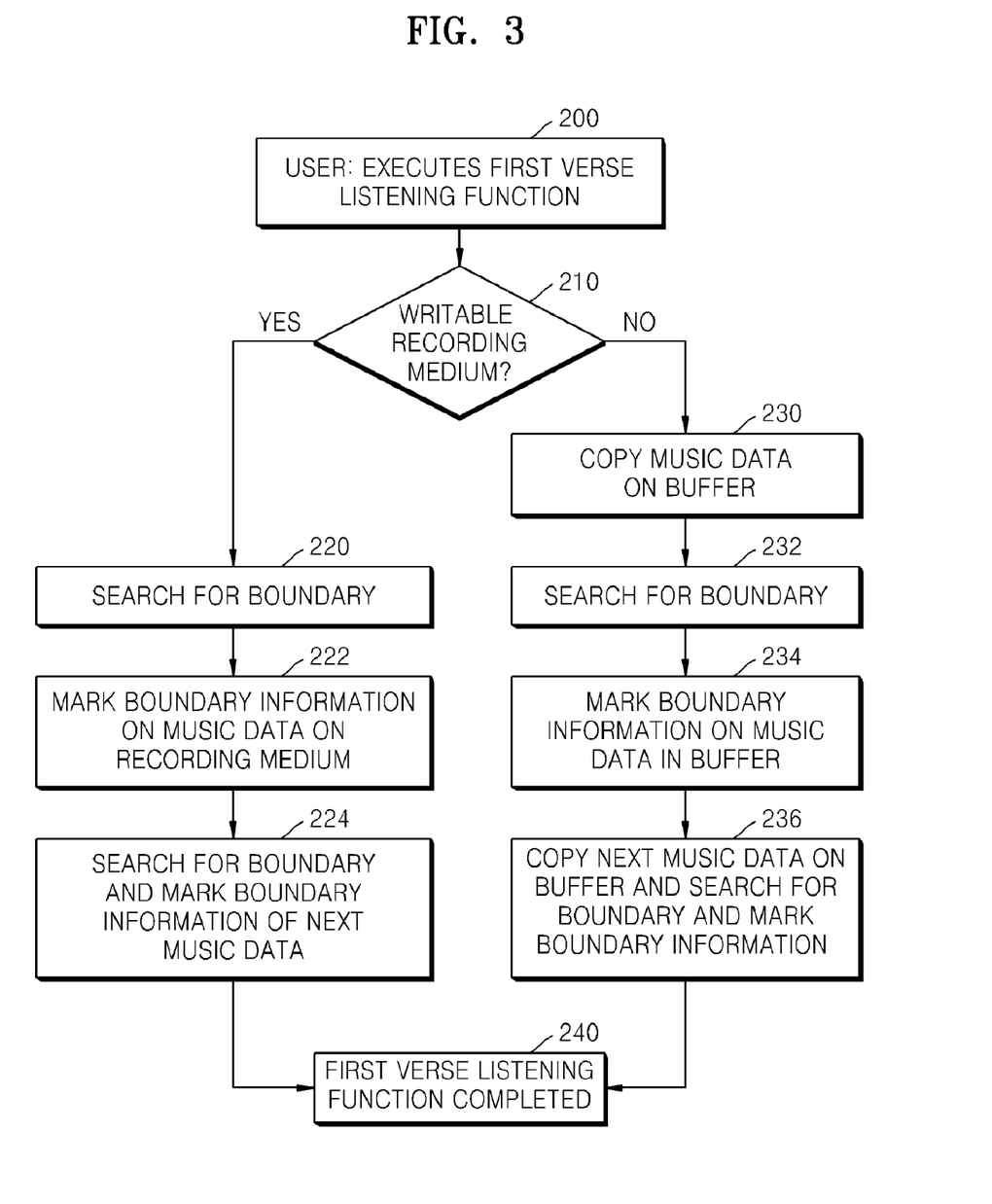
FIG. 3 is a flowchart illustrating a method of reproducing music data according to an example embodiment of the present invention.

FIG. 3 is a flowchart illustrating a method of reproducing music data according to an example embodiment of the present invention. When a user executes a first verse listening function in operation 200 and the music data starts to be reproduced, a boundary search process and a boundary information marking process are simultaneously performed as follows.

First in operation 210, it is determined whether a recording medium that stores the music data is a rewritable recording medium. If the recording medium is a rewritable recording medium (branch Yes), a boundary between the first part and the second part from among repeated parts of the music data is searched for, in operation 220, and boundary information is marked on the music data on the recording medium, in operation 222. Also, while the current music data is being reproduced, the boundary search process and the boundary information marking process are performed on the next music data, in operation 224.

On the other hand, if the recording medium is a non-rewritable recording medium (branch No), the music data is copied on a buffer, in operation 230, the boundary is searched for, in operation 232, and the boundary information is marked on the music data in the buffer, in operation 234. Also, while the current music data is being reproduced, the next music data is copied on the buffer, and the boundary search process and the boundary information marking process are performed on next music data, in operation 236.

While reproducing the music data, when a part indicated by the marked boundary information is reached, the reproducing of the music data is stopped. Accordingly, the first verse listening function is completed in operation 240.

As described above, a delay is prevented by analyzing the next music data immediately after analyzing the current music data. In example embodiments, the analysis involves the frequency, lyrics, notes, and/or the frequencies of the lyrics and/or the notes of the music data.

Figure 4:
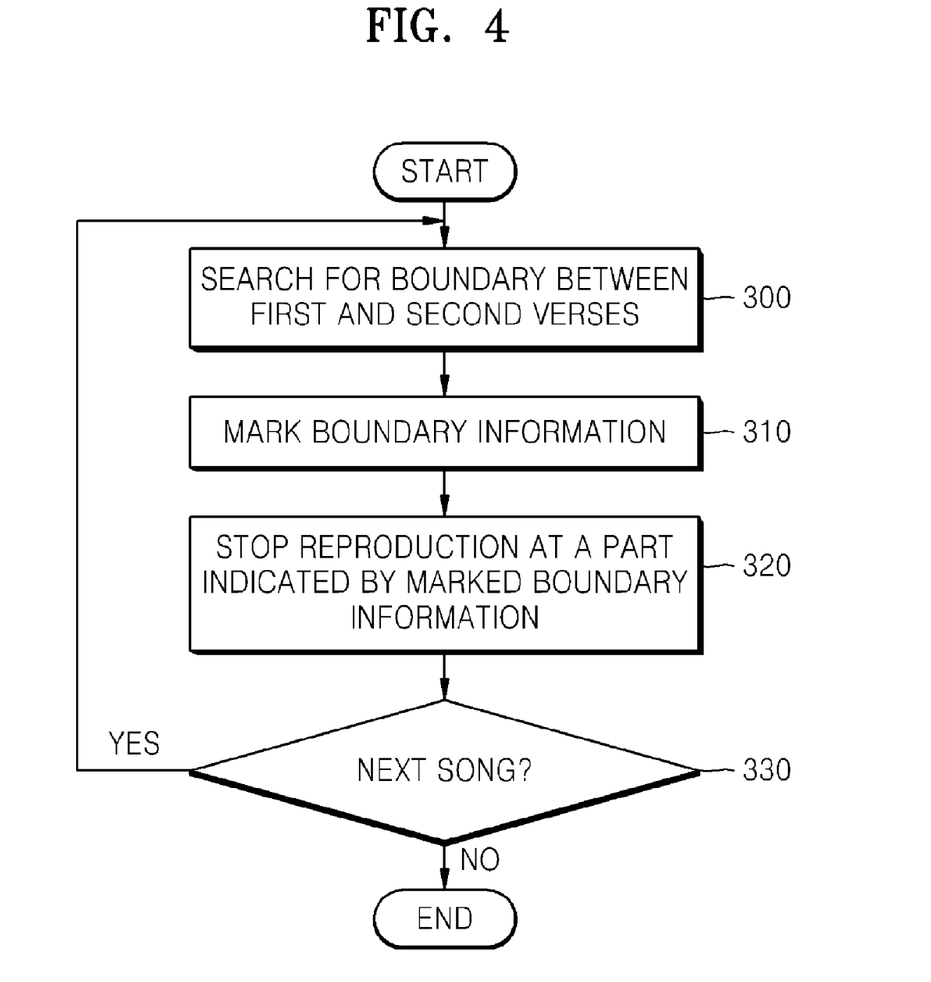
FIG. 4 is a flowchart illustrating a method of reproducing music data according to another example embodiment of the present invention.

FIG. 4 is a flowchart illustrating a method of reproducing music data according to another example embodiment of the present invention. First, a boundary between the first and second verses is searched for, in operation 300. Boundary information about the found boundary is marked, in operation 310, and the reproducing of the music data is stopped at a part indicated by the marked boundary information, in operation 320. If a next music data exists (branch Yes), in operation 330, operations 300 through 320 are performed on the next music data. In this case, like the method of FIG. 3, operations 300 and 310 are performed on the next music data while reproducing the current music data so as to prevent a delay in the reproduction of the next music data. On the other hand, if the next music data does not exit (branch No), the operation ends.

A detailed example of the boundary search process is as follows. First, before reproducing the music data, a frequency of the notes, for example, of the music data is analyzed by fully scanning the music data. After analyzing the frequency, the music data is divided into two parts, each part being ½ of the whole reproducing time of the music data, for example. The first half of the two parts is established as a first window. In example embodiments, the first half of the two parts that is established as the first window is referred to as a first window part, and its music data is used as, or is, the first window.

It is determined whether there is a part of the music data that is identical to the first window by scanning the music data from the beginning, but excluding a starting point or a small portion at the start of the music data (i.e., within the first window part). For convenience of description, a part of the music data that is identical to the first window is referred to as a first identical part in example embodiments of the present application.

The reason for excluding the starting point, or the small portion at the start of the music data, is as follows. If the part of the music data, including the starting point, that is identical to the first window (i.e., the first window part) is included in a search over the whole music data using the first window, the first window part itself becomes the first identical part. Accordingly, in order to exclude the first window part from being a first identical part candidate, the starting point should be excluded as a subject of the search.

If the first identical part cannot be found using the first window, the music data is redivided into n parts, each part being 1/n of the whole reproducing time of the music data, where n is an integer equal to or greater than 3. Then, a first part among the n parts is established as a second window, and a part of the music data that is identical to the second window is searched for in the music data. This part that is identical to the second window will be referred to as a second identical part. As such, by searching for a boundary between the first and second parts (e.g., verses) while reducing a size of a window, the boundary can be easily found without performing a complicated boundary search process, so as to perform a first verse listening function.

Here, whether the repeated parts are identical (or whether the searched part is identical to a window) does not refer to 100% identicalness. According to an analysis of general music data where notes are the same but lyrics are different, differences exist when a frequency is analyzed due to the differences in the lyrics. Accordingly, a predetermined rate is established to determine whether the repeated parts are identical, and when two parts are identical at the predetermined rate or more, it can be determined that the two parts are identical. For example, if two parts are deemed to be 95% identical or more by calculating correlation of the two parts during the frequency analysis, it can be determined that the two parts are identical. It is understood that the predetermined rate need not be 95%, and that is adjustable.

Figure 5:
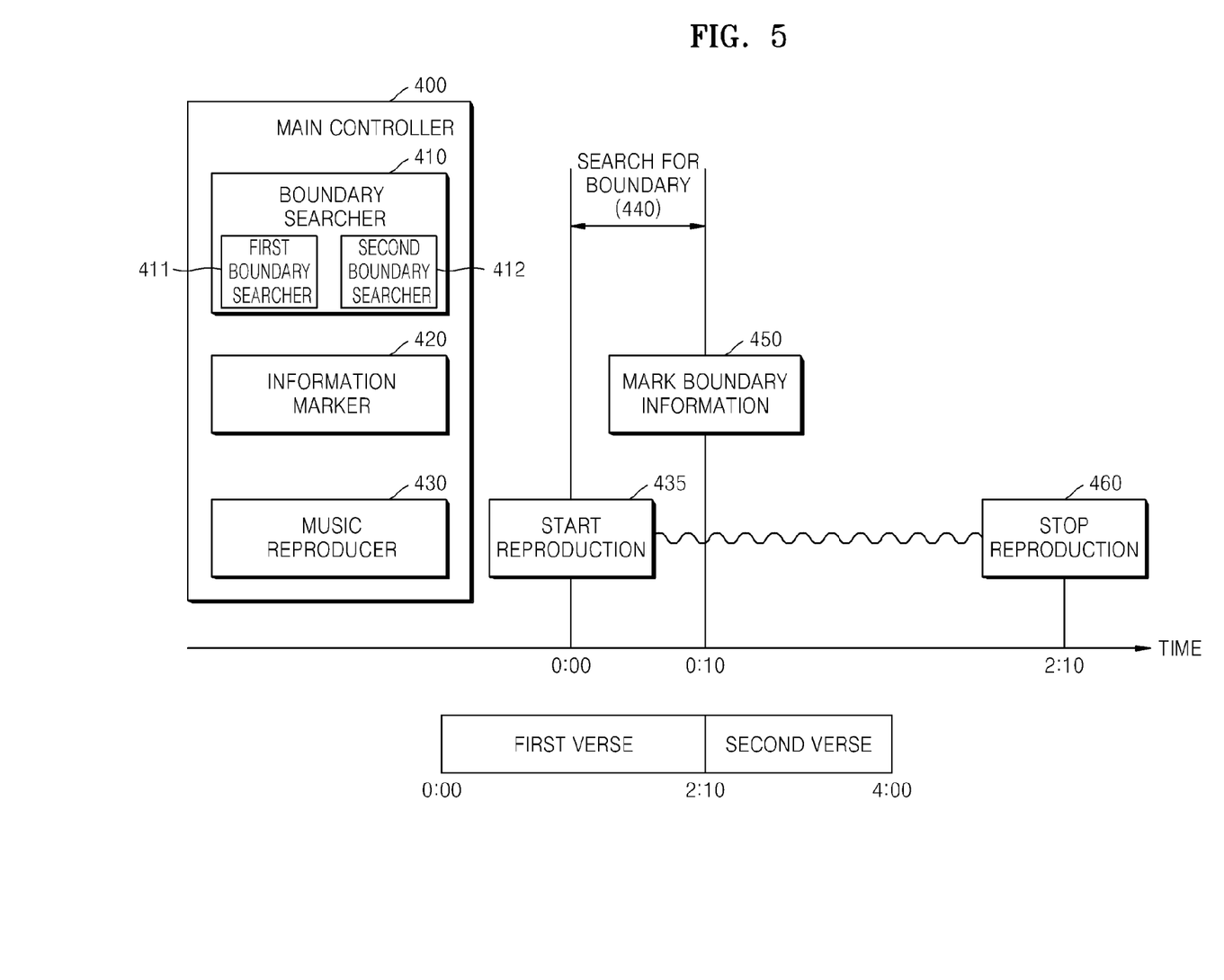
FIG. 5 is a diagram illustrating an apparatus for reproducing music data according to an example embodiment of the present invention and operations performed by each element of the apparatus on the music data according to time.

FIG. 5 is a diagram illustrating main controller 400 according to an example embodiment of the present invention and operations performed by each element of the main controller 400 on the music data according to time. The main controller 400 may include a boundary searcher 410, an information marker 420, and a music reproducer 430.

First, the music reproducer 430 starts to reproduce the music data in operation 435, and simultaneously, the boundary searcher 410 searches for a boundary between first and second verses in operation 440. Operation 440 can be completed within a relatively short time since it is performed via simple frequency analysis, for example.

In the example embodiment of FIG. 5, shown are the whole reproducing time of the music data as 4 minutes, the reproducing time of the first verse as 2 min. 10 sec., and the reproducing time of the second verse as 1 min. 50 sec. In this case, the boundary searcher 410 is shown as searching for the boundary within a time (in FIG. 5, 10 sec.) that is shorter than the reproducing time of the first verse, and in operation 450 the information marker 420 is shown as marking boundary information indicating that a point at 2 min. 10 sec. is a part where the first verse ends in a file.

Then, the music reproducer 430 becomes aware that the point at 2 min. 10 sec. is where the first verse ends by referring to the marked boundary information. Accordingly, in operation 460, the music reproducer 430 stops reproducing the music data at the point at 2 min. 10 sec., which is the boundary between the first and second verses. In example embodiments of the present invention, the boundary searcher 410 may include a first identical part searcher 411 and a second identical part searcher 412.

Functions of the first and second identical part searchers 411 and 412 will now be described with reference to FIGS. 6A-6C and 7A-7C. The first identical part searcher 411 divides music data into two parts, each part being ½ of the whole reproducing time of the music file, establishes the music data of the first part (the first window part) of the two parts as a first window, searches for a first identical part that is identical to the first window part using the first window by scanning the music data from the beginning, but excluding a starting point, and determines a starting point of the first identical part as a boundary between the first and second parts from among the two parts.

If the first identical part searcher 411 cannot find the first identical part, the second identical searcher divides the music data into at least three parts over the whole reproducing time of the music data, and searches for a boundary between the first and second parts. That is, the second identical part searcher redivides the music data into n parts, each part being 1/n of the whole reproducing time where n is an integer equal to or greater than 3, establishes the music data of a first of the n parts (referred to as the second window part) as a second window, searches for a second identical part that is identical to the second window by scanning the music data from the beginning, but excluding the starting point, and determines a starting point of the second identical part as the boundary between the first and second parts from among the n parts.

Figure 6A:
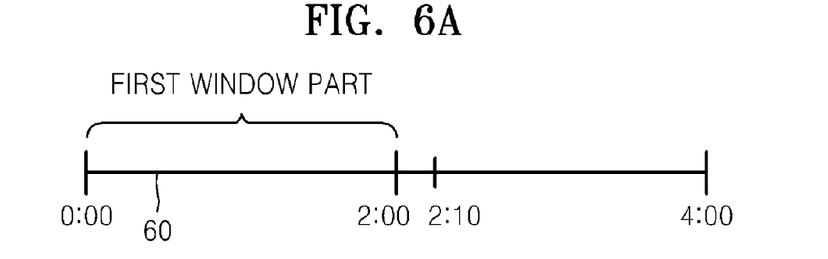
FIGS. 6A-6C are diagrams illustrating an example of a process of searching for an identical part using a first window according to an example embodiment of the present invention.

FIG. 6A is a diagram illustrating an example of applying a process of searching for a first identical part on the music data according to an example embodiment of the present invention of FIG. 5. The whole length of the music data of FIG. 5 is 4 minutes, and the boundary between the first and second verses exists at 2 min. 10 sec., from a starting point at 0 min. 00 sec. First, the first identical part searcher divides the music data into 2 parts, each part being 2 min., that is ½ of the whole reproducing time 4 min., establishes the first part of 2 min. (referred to as a first window part 60), as a first window 61 as illustrated in FIG. 6A. In example embodiments, the music data of the first window part 60 is used as the first window 61.

Figure 6B:
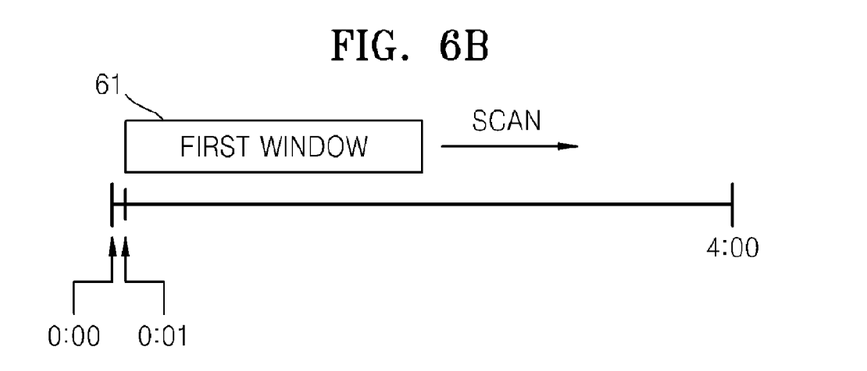

FIG. 6B illustrates an example where a portion including the starting point of the music data is excluded. The first identical part searcher searches for a first identical part that is identical to the first window 61, by scanning the music data beginning from a point of location (referred to as a scan starting point) that is after 1 second from the starting point, for example. The scan starting point may be any point after the starting point, and may be more than 1 second after the starting point.

If the first identical part is found in the music data, the first identical part searcher determines a starting point of the first identical part as a boundary between the first and second parts of the two repeated parts.

Figure 6C:
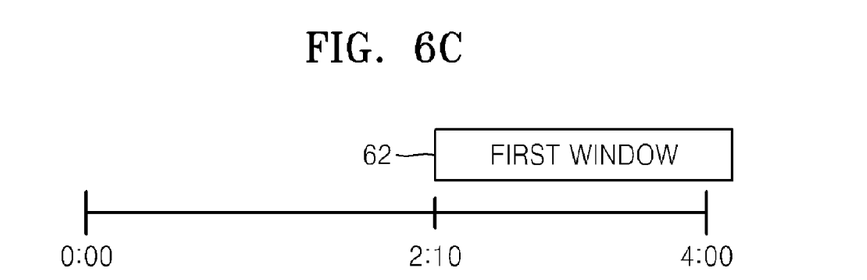

Referring to FIG. 6C, when a starting point 62 of the first window 61 reaches a time point at 2 min. 10 sec., the starting point 62 to 1 min. 50 sec. time point of the first window will come to correspond to 2 min. 10 sec. to 4 min time points of the music data. However, it may be the case that a part of the music data that is identical to the entire first window (having a length of 2 min.) does not exist anywhere in the portion of the music data that is subsequent to the scan starting point.

Accordingly, it may be that it is not possible to find the first identical part in the music data of FIG. 5 by dividing the music data into just two parts. Consequently, the music data may be redivided into three parts, each part being ⅓ of the whole reproducing time, so as to search for the boundary between newly divided first and second parts.

Figure 7A:
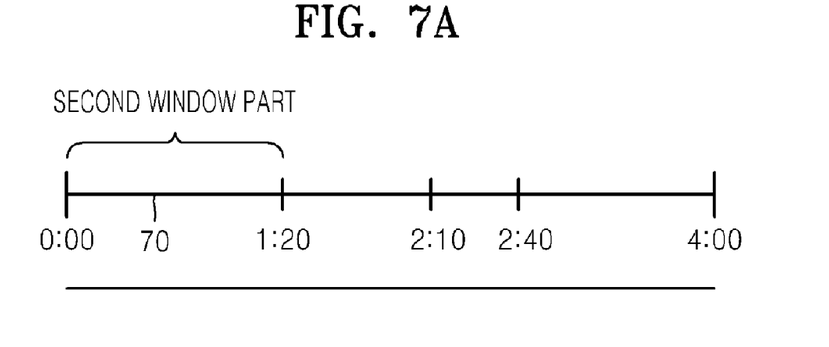
FIGS. 7A-7C are diagrams illustrating an example of a process of searching for an identical part using a second window according to an example embodiment of the present invention.

FIG. 7A is a diagram illustrating an example of applying a process of searching for an identical part (referred to as a second identical part) according to an example embodiment of the present invention on the music data of FIG. 5. First, the second identical part searcher divides the music data into three parts, each part being 1 min. 20 sec. (i.e. ⅓ of the whole reproducing time 4 min.), and establishes the first part (referred to as a second window part 70) of the three parts as a second window 71, as illustrated in FIG. 7A. In example embodiments, the music data of the second window part 70 is used as the second window 71.

Figure 7B:
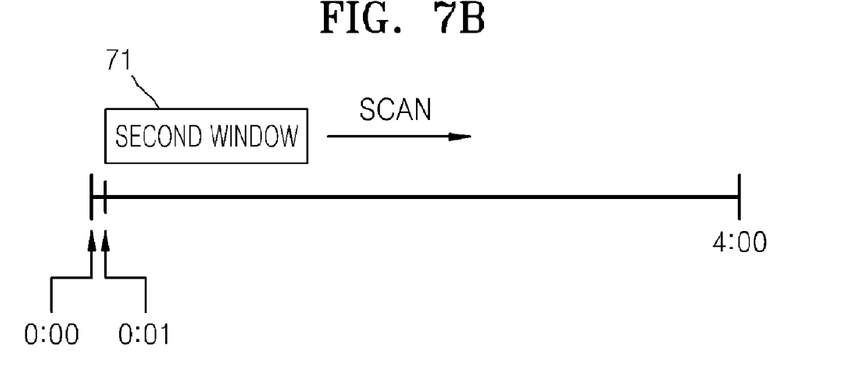

FIG. 7B illustrates an example where a portion including the starting point of the music data is excluded. The second identical part searcher searches for a second identical part that is identical to the second window 71, by scanning the music data beginning from a point of location (referred to as a scan starting point) that is after 1 second from the starting point, for example. The scan starting point may be any point after the starting point, and may be more than 1 second after the starting point.

Figure 7C:
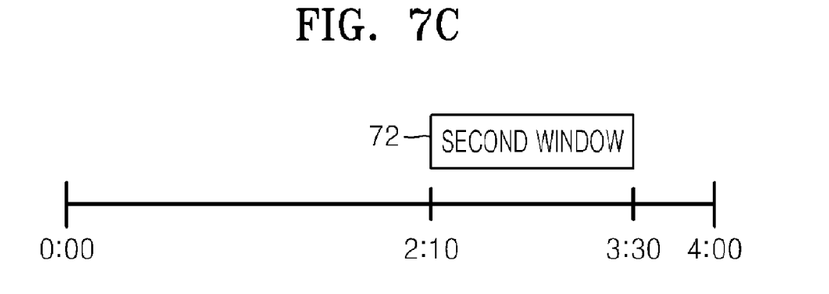

Referring to FIG. 7C, when a starting point 72 of the second window 71 reaches the 2 min. 10 sec. time point of the music data, the starting point 72 to 1 min. 20 sec. time point of the second window 71 will come to correspond to 2 min. 10 sec. to 3 min. 30 sec. time points of the music data. The second identical part searcher determines the 2 min. 10 sec. time point of the music data, i.e., the starting point of the second identical part, as the boundary between the first and second parts from among the three parts. The information marker 420 of FIG. 5 marks information indicating that the 2 min. 10 sec. time point from the starting point of the music data is the boundary between the first and second parts, in a file.

However, if the second identical part is not found even after performing the process of FIGS. 7A-7C, the boundary searcher 410 of FIG. 5 increases the value of n by 1, and the second identical part searcher performs the process of FIGS. 7A-7C again on the redivided music data. For example, if the second identical part is not found when the value of n is i, the second identical part searcher repeatedly performs the above process after increasing the value of n by 1, i.e. i+1, so as to redivide the music data into i+1 parts.

As above, since the boundary between the first and second parts from among the repeated parts is searched for by increasing the value of n, the boundary can be found not only when the music data includes two repeated parts, but also when the music data includes 3 or more repeated parts. It is understood that with the increase in the value of n, there is a corresponding decrease in a size of the second window used for the search over the music data.

However, a process of dividing the music data into n parts and using the first 1/n part as a window by increasing the value of n by one when the prior search fails is not infinitely performed. The maximum value of n is established, and if an identical part is not found until the value of n reaches the maximum value, the entire music data is reproduced. Since the example embodiments of the present invention is about automatically reproducing the first verse of several songs, satisfaction of a user would not remarkably decrease even if listening to only the first verse of one song from among the several songs fails so as to cause the user to occasionally listen to the entire song. On the contrary, a malfunction of an apparatus caused by an endless loop of the process of searching for an identical part, which will cause greater dissatisfaction of the user, can be prevented.

According to example embodiments of the present invention, a user can listen to more songs including repeated parts by searching for a boundary between first and second parts of music data having repeated parts via simple frequency analysis, for example, marking information indicating the found boundary, and reproducing the music data until a part indicated by the marked information is reached. Accordingly, music reproduction satisfaction increases since an inconvenience of manipulating the apparatus for each song is removed and more songs having different patterns are played. Also, a manufacturer can manufacture and provide a satisfactory apparatus to a user (e.g., consumer).

In example embodiments, although the division of the music data is discussed based on the reproducing time of the music data, in other example embodiments, the division of the music data may be based on an amount of data, notes, words of the lyric, or others.

In example embodiments, although discussed in terms of music, song, or music data, it is understood that the example embodiments are applicable any recording, or data that have repeating patterns.

In example embodiments, the apparatus 10 for reproducing music data can be a mobile device, a music box, a stereo system, a home theater system, etc. Examples of a mobile device may include a smart phone, a mobile computer, a media recorder (such as a digital audio/video recorder, or a digital camera), a media player, a personal navigation device, and other communication devices.

The invention can also be embodied as computer readable codes on a computer (including all apparatuses having an information processing function) readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, in other example embodiments, lyrics and/or notes analysis may be performed, whereby degree of similarity or matching of the lyrics and/or notes is performed, for example, for identification and/or classification of the boundary. In example embodiments, the boundary also refers to a point where the first verse ends and the second verse begins, or is simply a point where a part that is identical to the first verse begins. Accordingly, it is intended, therefore, that the present invention not be limited to the various example embodiments disclosed, but that the present invention includes all embodiments falling within the scope of the appended claims.

What is claimed is:

1. A method of reproducing music data having a plurality of repeated parts, the method comprising:
    searching for a boundary between a first part and a second part of the music data from among the plurality of repeated parts by analyzing the music data in a frequency domain;
    marking information in the music data indicating that the boundary between the first and second parts is a point where the first part ends; and
    reproducing the music data from a beginning of the music data to the point indicated by the marked information of the music data, wherein the searching for the boundary comprises:
    dividing the music data into the first and second parts, each part being ½ of the music data according to reproducing time of the music data, and establishing the first part as a first window;
    searching for a first identical part that is identical to the first window by scanning the music data excluding a starting point of the music data from the beginning of the music data; and
    determining a starting point of the first identical part as the boundary between the first and second parts.

2. The method of claim 1, wherein the searching for the first identical part comprises finding a part of the music data excluding the starting point that is identical to the first window at a predetermined rate or more, and determining the point as the first identical part.

3. The method of claim 1, wherein the searching for the boundary further comprises, if the first identical part is not found, searching for the boundary by redividing the music data into at least three parts according to the reproducing time.

4. The method of claim 3, wherein the searching for the boundary by dividing the music data into at least three parts comprises:
    dividing the music data into n parts, each part being 1/n of the music data according to the reproducing time, and establishing a first part of the n parts as a second window, where n is an integer equal to or greater than 3;
    searching for a second identical part that is identical to the second window by scanning the music data excluding the starting point of the music data from the beginning of the music data; and
    determining a starting point of the second identical part as the boundary.

5. The method of claim 4, wherein the searching for the second identical part comprises finding a part of the music data excluding the starting point of the music data that is identical to the second window at a predetermined rate or more, and determining the part as the second identical part.

6. The method of claim 4, wherein the searching for the boundary further comprises, if the second identical part is not found:
    increasing the value of n by 1; and
    repeating the dividing of the music data into n+1 parts and establishing a first part of the n+1 parts as a new second window, searching for a new second identical part that is identical to the new second window, and determining a starting point of the new second identical part as the boundary.

7. The method of claim 1, wherein the plurality of repeated parts included in the music data are a plurality of verses, and the first part and the second part are respectively a first verse and a second verse of the music data.

8. The method of claim 1, wherein the searching for the boundary between the first part and the second part and the marking of the information are performed while the music data is being reproduced.

9. The method of claim 1, further comprising, while the music data is being reproduced, searching for a boundary between a first part and a second part of a next music data from among a plurality of repeated parts of the next music data and marking information in the next music data indicating that the boundary between the first and second parts of the next music data is a point where the first part ends on the next music data.

10. An apparatus reproducing music data having a plurality of repeated parts, the apparatus comprising:
    a boundary searcher to search for a boundary between a first part and a second part of the music data from among the plurality of repeated parts by analyzing the music data in a frequency domain;
    an information marker to mark information in the music data indicating that the boundary is a point where the first part ends; and
    a music reproducer to reproduce the music data from a beginning to the point indicated by the marked information, wherein
    the boundary searcher comprises a first identical part searcher to divide the music data into the first and second parts, each part being ½ of the music data according to reproducing time of the music data, to establish the first part as a first window, to search for a first identical part that is identical to the first window by scanning the music data excluding a starting point of the music data from a beginning of the music data, and to determine a starting point of the first identical part as the boundary between the first and second parts.

11. The apparatus of claim 10, wherein the first identical part searcher finds a part of the music data excluding the starting point that is identical to the first window at a predetermined rate or more, and determines the point as the first identical part.

12. The apparatus of claim 10, wherein the boundary searcher further comprises a second identical part searcher, which, if the first identical part searcher did not find the first identical part, searches for the boundary by redividing the music data into at least three parts according to the reproducing time.

13. The apparatus of claim 12, wherein the second identical part searcher divides the music data into n parts, each part being 1/n of the music data according to the reproducing time, and establishes a first part of the n parts as a second window, where n is an integer equal to or greater than 3, searches for a second identical part that is identical to the second window by scanning the music data excluding the starting point of the music data from the beginning of the music data, and determines a starting point of the second identical part as the boundary.

14. The apparatus of claim 13, wherein the second identical part searcher finds a part of the music data excluding the starting point of the music data that is identical to the second window at a predetermined rate or more, and determines the part as the second identical part.

15. The apparatus of claim 13, wherein the boundary searcher, if the second identical part searcher did not find the second identical part, increases the value of n by 1 so that the second identical part searcher repeats the dividing of the music data into n+1 parts and establishing the first part of the n+1 parts as a new second window, searching for a new second identical part that is identical to the new second window, and determining a starting point of the new second identical part as the boundary.

16. The apparatus of claim 10, wherein the plurality of repeated parts included in the music data are a plurality of verses, and the first part and the second part are respectively a first verse and a second verse of the music data.

17. The apparatus of claim 10, wherein the boundary searcher and the information marker respectively search for the boundary between the first part and the second part and marks of the information while the music reproducer reproduces the music data.

18. A computer readable recording medium having recorded thereon a program for an apparatus to executing a method of reproducing music data having a plurality of repeated parts, the method comprising:
  searching for a boundary between a first part and a second part of the music data from among the plurality of repeated parts by analyzing the music data in a frequency domain;
  marking information in the music data indicating that the boundary between the first and second parts is a point where the first part ends; and
  reproducing the music data from a beginning to the point indicated by the marked information of the music data, wherein the searching for the boundary comprises:
  dividing the music data into the first and second parts, each part being ½ of the music data according to reproducing time of the music data, and establishing the first part as a first window;
  searching for a first identical part that is identical to the first window by scanning the music data excluding a starting point of the music data from the beginning of the music data; and
  determining a starting point of the first identical part as the boundary between the first and second parts.

19. A method of reproducing a portion of audio data having a repeating pattern comprising:
  dividing the audio data into at least two portions;
  selecting a first portion of the at least two portions as a first window, the first portion being the closest of the at least two portions to a beginning of the audio data;
  using the first window to scan the audio data starting from a point that is not the beginning of the audio data, and finding a portion of the audio data that matches the first window;
  marking a start point of the matching portion of the audio data as a start point of a first repeating portion of the audio data; and
  reproducing the audio data from the beginning of the audio data to the start point of the first repeating portion to reproduce the portion of audio data having the repeating pattern.

20. The method of claim 19, wherein the portion of the audio data partially matches the first window by a predetermined amount.

21. The method of claim 19, wherein the audio data is a music file containing a song, and the first repeating portion is a second verse of the song.

22. An apparatus for reproducing a portion of audio data having a repeating pattern comprising:
  a searcher to divide the audio data into at least two portions, to select a first portion of the at least two portions as a first window, the first portion being the closest of the at least two portions to a beginning of the audio data, and to use the first window to scan the audio data starting from a point that is not the beginning of the audio data and to find a portion of the audio data that matches the first window;
  a marker to mark a start point of the matching portion of the audio data as a start point of a first repeating portion of the audio data; and
  a reproducer to reproduce the audio data from the beginning of the audio data to the start point of the first repeating portion to reproduce the portion of audio data having the repeating pattern.

23. The apparatus of claim 22, wherein the portion of the audio data partially matches the first window by a predetermined amount.

24. The apparatus of claim 22, wherein the audio data is a music file containing a song, and the first repeating portion is a second verse of the song.

* * * * *